(12) United States Patent
Wijnant et al.

(10) Patent No.: US 11,839,836 B2
(45) Date of Patent: Dec. 12, 2023

(54) CHROMATOGRAPHY PLUG

(71) Applicant: BIO-RAD LABORATORIES, INC., Hercules, CA (US)

(72) Inventors: Pascal Wijnant, Oudenaarde (BE); John Tipton, Farfield, CA (US); Christopher Ward, Cloverdale, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 465 days.

(21) Appl. No.: 16/764,841

(22) PCT Filed: Nov. 17, 2017

(86) PCT No.: PCT/US2017/062414
§ 371 (c)(1),
(2) Date: May 15, 2020

(87) PCT Pub. No.: WO2019/099039
PCT Pub. Date: May 23, 2019

(65) Prior Publication Data
US 2020/0360837 A1 Nov. 19, 2020

(51) Int. Cl.
*B01D 15/22* (2006.01)
*C08L 27/16* (2006.01)
*G01N 30/60* (2006.01)

(52) U.S. Cl.
CPC .............. *B01D 15/22* (2013.01); *C08L 27/16* (2013.01); *G01N 30/6004* (2013.01)

(58) Field of Classification Search
CPC ...... B01D 15/22; C08L 27/16; G01N 30/6004
See application file for complete search history.

(56) References Cited

U.S. PATENT DOCUMENTS 4,283,280 A * 8/1981 Brownlee .............. B01D 15/22
   210/198.2
4,563,275 A   1/1986 McEachern
   (Continued)

FOREIGN PATENT DOCUMENTS

CA      1262870       11/1989
CN    103339502 A     10/2013
   (Continued)

OTHER PUBLICATIONS

International Search Report for PCT/US2017/062414 dated Aug. 14, 2018.
(Continued)

*Primary Examiner* — Benjamin L Lebron
(74) *Attorney, Agent, or Firm* — Kilpatrick Townsend & Stockton LLP (57) ABSTRACT

Chromatography column components are described. One component, a chromatography plug, can include a body, the body including: a first surface; a second surface opposing the first surface; a passage through the body extending from an opening in the first surface to an opening in the second surface; and a circumferential surface extending from the first surface to the second surface; a plurality of ridges, located on the first surface, wherein each of the plurality of ridges having a first end and an opposed second end, and the first end of each of the plurality of ridges being closer to one another than the second ends of each of the plurality of ridges. In some instances, a bridge can be located between the first ends, the bridge extending into the body. A porous partition can be located on or in the plug.

13 Claims, 6 Drawing Sheets

(56) References Cited

U.S. PATENT DOCUMENTS

| | | | |
|---|---|---|---|
| 4,861,473 A | 8/1989 | Shackelford et al. | |
| 6,530,288 B1 * | 3/2003 | August | G01N 1/405 73/863.31 |
| 2005/0082213 A1 * | 4/2005 | DeMarco | B01D 15/22 210/198.2 |
| 2005/0211617 A1 | 9/2005 | Held et al. | |
| 2005/0242018 A1 | 11/2005 | Hodgin et al. | |
| 2006/0011532 A1 | 1/2006 | Van Davelaar et al. | |
| 2008/0251489 A1 | 10/2008 | Livingston et al. | |
| 2013/0306563 A1 * | 11/2013 | Blaschyk | G01N 30/56 248/163.1 |
| 2014/0130580 A1 | 5/2014 | McAdams et al. | |
| 2014/0231330 A1 | 8/2014 | Baumann et al. | |
| 2015/0323509 A1 | 11/2015 | Kirby et al. | |
| 2016/0187306 A1 * | 6/2016 | Pohl | G01N 30/6065 436/178 |
| 2017/0322189 A1 | 11/2017 | Brandlhuber | |

FOREIGN PATENT DOCUMENTS

| | | |
|---|---|---|
| CN | 204241437 U | 4/2015 |
| CN | 105004823 A | 10/2015 |
| CN | 107345869 A | 11/2017 |
| EP | 2557409 A1 | 2/2013 |
| EP | 3242131 A1 | 11/2017 |
| GB | 2162489 B | 2/1986 |
| JP | H0514869 | 2/1993 |
| WO | 99/36722 | 7/1999 |
| WO | 0198748 A1 | 12/2001 |
| WO | 2005087339 A1 | 9/2005 |
| WO | 2012074452 A1 | 6/2012 |

OTHER PUBLICATIONS

Written Opinion of the International Search Authority PCT/US2017/062414 dated Aug. 14, 2018.
Extended European Search Report dated May 11, 2021 in EP Patent Application No. 17932026.2. 8 pages.
Examination Report dated Apr. 29, 2022 in IN Patent Application 202047026702. 5 pages.
English translation of Office Action dated Sep. 20, 2022 in CN Patent Application No. 201780096852.7. 5 pages.
English translation of Office Action dated Oct. 13, 2022 in CN Patent Application No. 201880084792.1. 17 pages.
English translation of Office Action dated Feb. 7, 2023 in JP Patent Application No. 2020-535251. 3 pages.
English translation of Office Action dated Mar. 25, 2023 in CN Patent Application No. 201780096852.7. 5 pages.

* cited by examiner

CHROMATOGRAPHY PLUG

CROSS-REFERENCE TO RELATED APPLICATION

The present application is the U.S. national phase of PCT Application No. PCT/US2017/062414 filed on Nov. 17, 2017, the disclosure of which is incorporated herein by reference in its entirety

TECHNICAL FIELD

This disclosure relates to chromatography systems, and in particular to plugs used in chromatography column ends to restrain movement of packing material such as stationary phase material.

BACKGROUND

Chromatography frequently includes flowing a fluid through a medium in a tube for separation of a sample into its component parts. The medium can comprise bed of small beads. For some devices, a device is required to retain the medium in the tube against gravity forces and/or the force imposed upon the medium by the fluid flowing through the medium. It is desirable that the devices that retain the medium not interact with the medium and/or the sample components and that it be designed to sufficiently support the medium to avoid damage to the device the medium or other parts associated with the chromatography system.

SUMMARY

In a first aspect disclosed herein is a chromatography plug, the chromatography plug comprising: a body, the body comprising: a first surface; a second surface opposing the first surface; a passage through the body extending from an opening in the first surface to an opening in the second surface; and a circumferential surface extending from the first surface to the second surface; a plurality of ridges, located on the first surface, wherein each of the plurality of ridges having a first end and an opposed second end, and the first end of each of the plurality of ridges being closer to one another than the second ends of each of the plurality of ridges; and a bridge located between the first ends, the bridge extending into the body.

In a second aspect disclosed herein is a chromatography plug, the chromatography plug comprising: a body, the body comprising: a first surface; a second surface opposing the first surface; a passage through the body extending from an opening in the first surface to an opening in the second surface; and a circumferential surface extending from the first surface to the second surface; a plurality of ridges, located on the first surface, wherein each of the plurality of ridges having a first end and an opposed second end, and the first end of each of the plurality of ridges being closer to one another than the second ends of each of the plurality of ridges; and a bridge located between the first ends, the bridge extending into the body, wherein the first surface comprises: a peripheral rim located at a periphery of the first surface, the first surface defining a central opening with the peripheral rim at a periphery of the central opening, the peripheral rim having a top face directed away from the second face; and a sloped face extending from the peripheral rim to the opening in the first surface, wherein the sloped face forms an obtuse angle with the peripheral rim; wherein each of the plurality of ridges is recessed from the top face, each of the plurality of ridges having a top surface distal the first surface and the bridge having a top surface; the bridge extending into the body at the opening in the first surface and supported by an interior surface of the passage and the bridge having a top surface external to the body and facing away from the first surface.

In a third aspect disclosed herein a chromatography column cartridge is provided, the chromatography column cartridge comprising: a tube having a first end and a second end opposite the first end; a chromatography plug, wherein the chromatography plug comprises: a body, the body comprising: a first surface; a second surface opposing the first surface; a passage through the body extending from an opening in the first surface to an opening in the second surface; and a circumferential surface extending from the first surface to the second surface; a plurality of ridges, located on the first surface, wherein each of the plurality of ridges having a first end and an opposed second end, and the first end of each of the plurality of ridges being closer to one another than the second ends of each of the plurality of ridges; and a bridge located between the first ends, the bridge extending into the body, wherein the first surface comprises: a peripheral rim located at a periphery of the first surface, the first surface defining a central opening with the peripheral rim at a periphery of the central opening, the peripheral rim having a top face directed away from the second face; and a sloped face extending from the peripheral rim to the opening in the first surface, wherein the sloped face forms an obtuse angle with the peripheral rim; wherein each of the plurality of ridges is recessed from the top face, each of the plurality of ridges having a top surface distal the first surface and the bridge having a top surface; the bridge extending into the body at the opening in the first surface and supported by an interior surface of the passage and the bridge having a top surface external to the body and facing away from the first surface; wherein the chromatography plug is located in the first end with the circumferential surface in sealing communication with the tube; and a porous partition located in the central opening and contacting the peripheral rim and supported by the top surfaces of the plurality of ridges and the top surface of the bridge.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

In some embodiments of a chromatography system, a chromatography column can comprise a body with a medium (or stationary phase) located within. A plug can be provided in one or both ends to retain the medium within the column, where the plug provides a flow path from a first end, such as end proximate the medium to a second end distal the medium. In some embodiments, the flow can be from the end distal the medium to the end proximal the medium.

Figure 1:
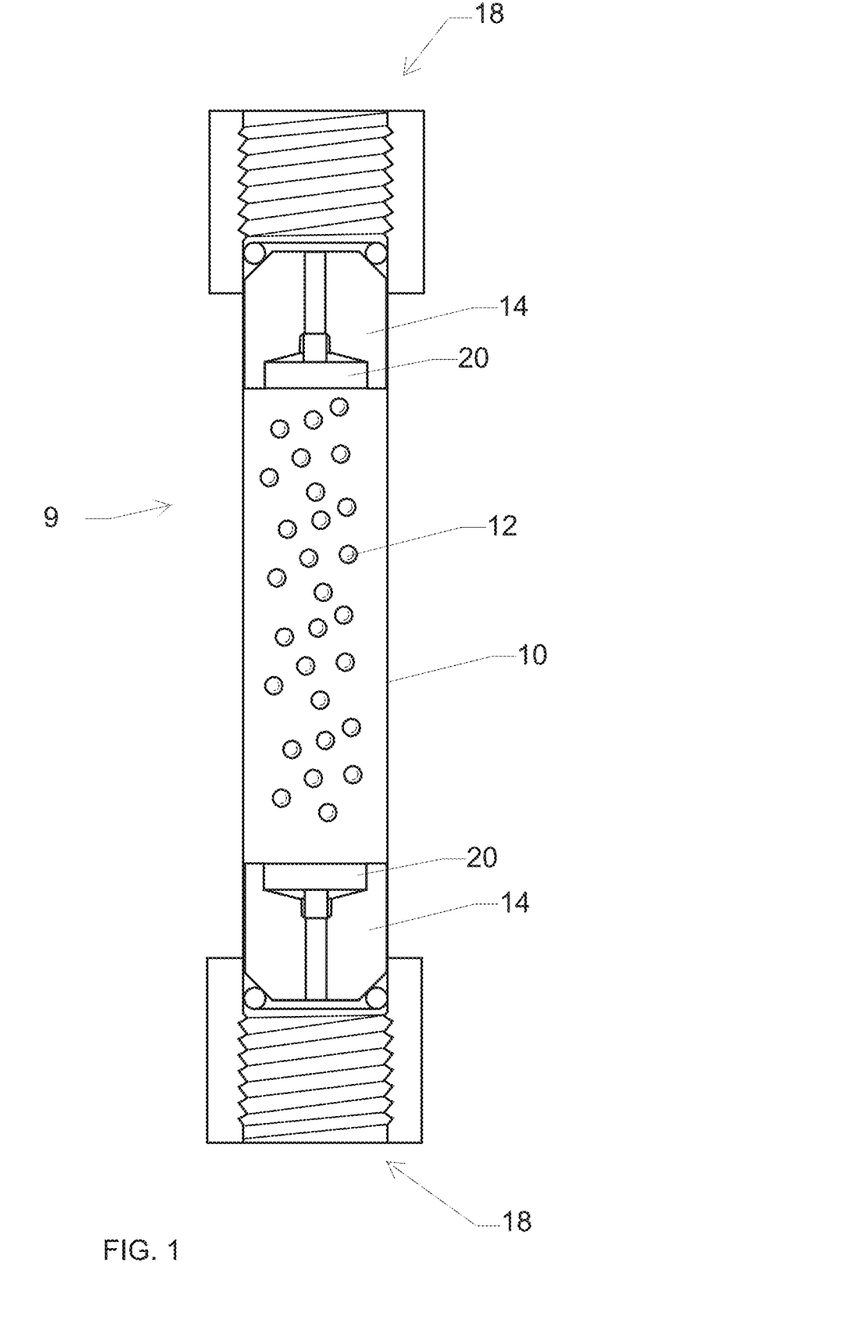
FIG. 1 shows an embodiment of a chromatography column.

FIG. 1 shows an embodiment of a chromatography column 9 comprising a tube 10, medium 12, a first plug 14 and a second plug 14. As shown in FIG. 1, the fluid (or mobile phase) can travel from the first end 18, through the first plug 14, through a first partition 20, through the medium 12, through the second partition 20, through the second plug 14, and out the second end 24.

Figure 2A:
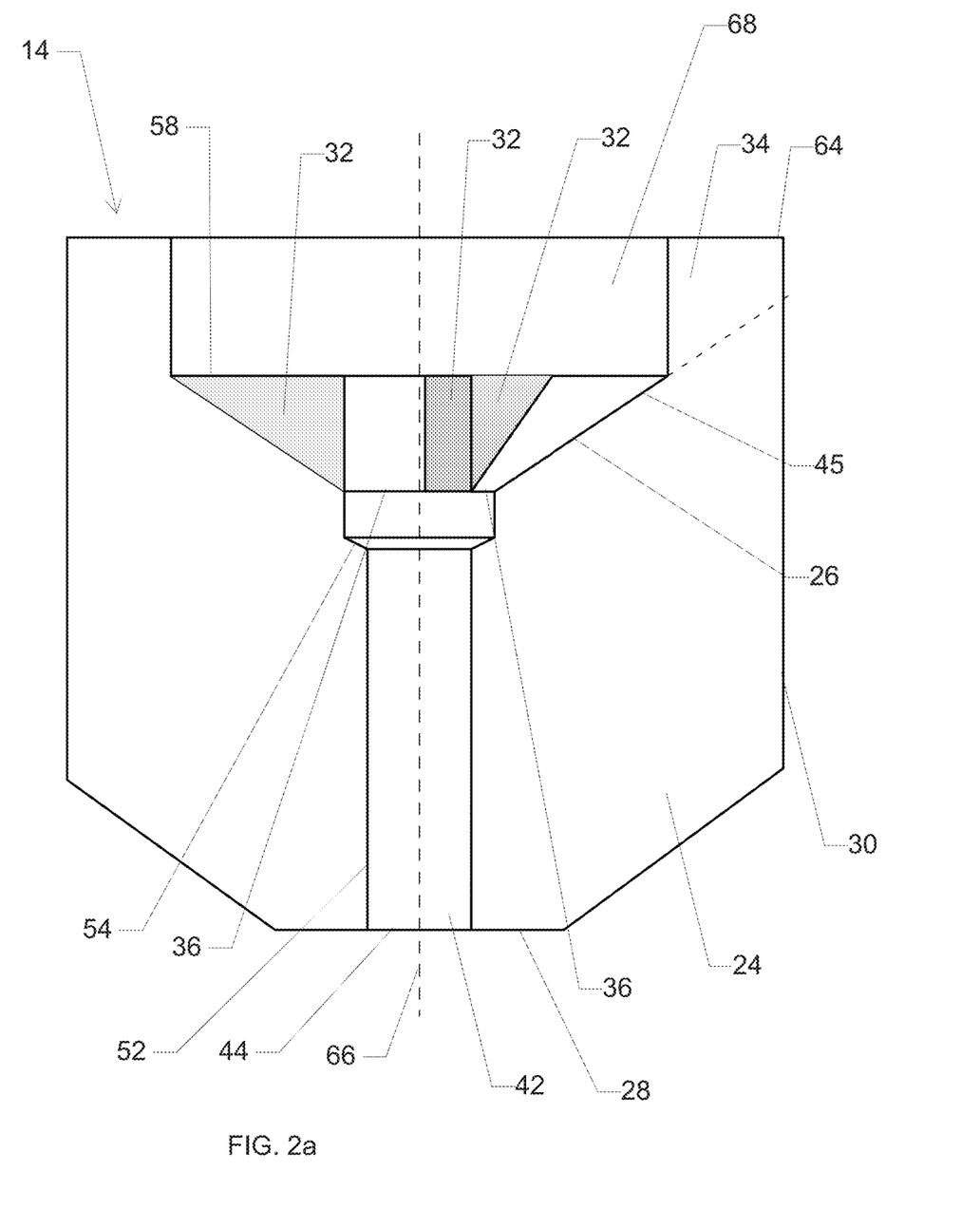
FIG. 2a shows an embodiment of a chromatography plug.

FIG. 2a shows an embodiment of a plug 14. Plug 14 can comprise a body 24 configured to fit into and seal the tube of a chromatography tube or a fitting of a chromatography tube against leaks. The body 24 can have a first surface 26, a second surface 28 and a circumferential surface 30 extending between the first surface 26 and the second surface 28. As shown in FIG. 2a, first surface 26 can include an optional peripheral rim 34 located at a periphery of the first surface 26. In some embodiments, a portion of first surface 26 can have a sloped shape forming a sloped face 45 which can be placed at an obtuse angle 60 with optional peripheral rim 34 and/or can be placed at an acute angle 62 with circumferential surface 30 and can direct flow of fluid passing through the chromatography column to the opening 36 in the first surface 26 and into passage 42.

The first surface 26 can have a plurality of ridges 32 extending from the first surface 26. Each of the plurality of ridges having a respective first end 46 and a second end 48. As shown in FIG. 2a, each of the plurality of ridges can extend from the first surface 26 in a direction away from the second surface 28 with a top surface 58 distal the first surface, with the second end 48 proximate or contacting a peripheral rim 34 located at a periphery of the body 24. In some embodiments, the ridges can have a graduated thickness which is thin at the second end 48 and thick at the first end 46, and the graduated thickness can follow the sloped shape of the first surface 26 such that the top surface 58 of the ridges 32 form a substantially level surface that is substantially perpendicular to the circumferential surface 30.

In some embodiments, two ridges 32 can be present, and in other embodiments a greater number of ridges can be present, such as 3, 4, 5, 6 or more. In some embodiments, the ridges can be positioned around an opening 36 in the first surface 26. In some embodiments, the opening 36 in the first surface 26 can be located at the center of the first surface 26, while in other embodiments, the opening 36 in the first surface 26 can be offset from the center of the first surface 26.

In some embodiments, the plurality of ridges 32 can be arranged in a spoke and hub arrangement with the opening 36 in the first surface 26. In some embodiments, the opening 36 in the first surface 26 can be centered within the plurality of ridges 32, while in some embodiments, the opening 36 in the first surface 26 can be located at a location that off-center from the plurality of ridges 32.

In some such embodiments, each of the plurality of ridges 32 can have a first end 46 and a second end 48 where the first end 46 is located proximate the opening 36 in the first surface 26 and the second end 48 is located distal the opening 36 in the first surface 26. In some embodiments, each of the first ends 46 can be located equal distance from the opening 36 in the first surface 26, and in some embodiments, one or more of the first ends 46 can located a different distance from the opening 36 in the first surface 26 than the other first ends 46. In some embodiments, each of the plurality of ridges 32 can be evenly distributed around the opening 36 in the first surface 26, such as where two ridges are located 180° apart from one another, or where each of the three ridges are located 120° from the nearest ridge 32, or where each of the four ridges are located 90° from the nearest ridge 32. To generalize this arrangement, each of n ridges 32 can be located 360°/n apart from the nearest ridge 32. In some embodiments, the ridges 32 can be both evenly distributed around the opening 36 in the first surface 26 and have each of the first ends 46 located an equal distance from the opening 36 in the first surface 26.

Figure 2B:
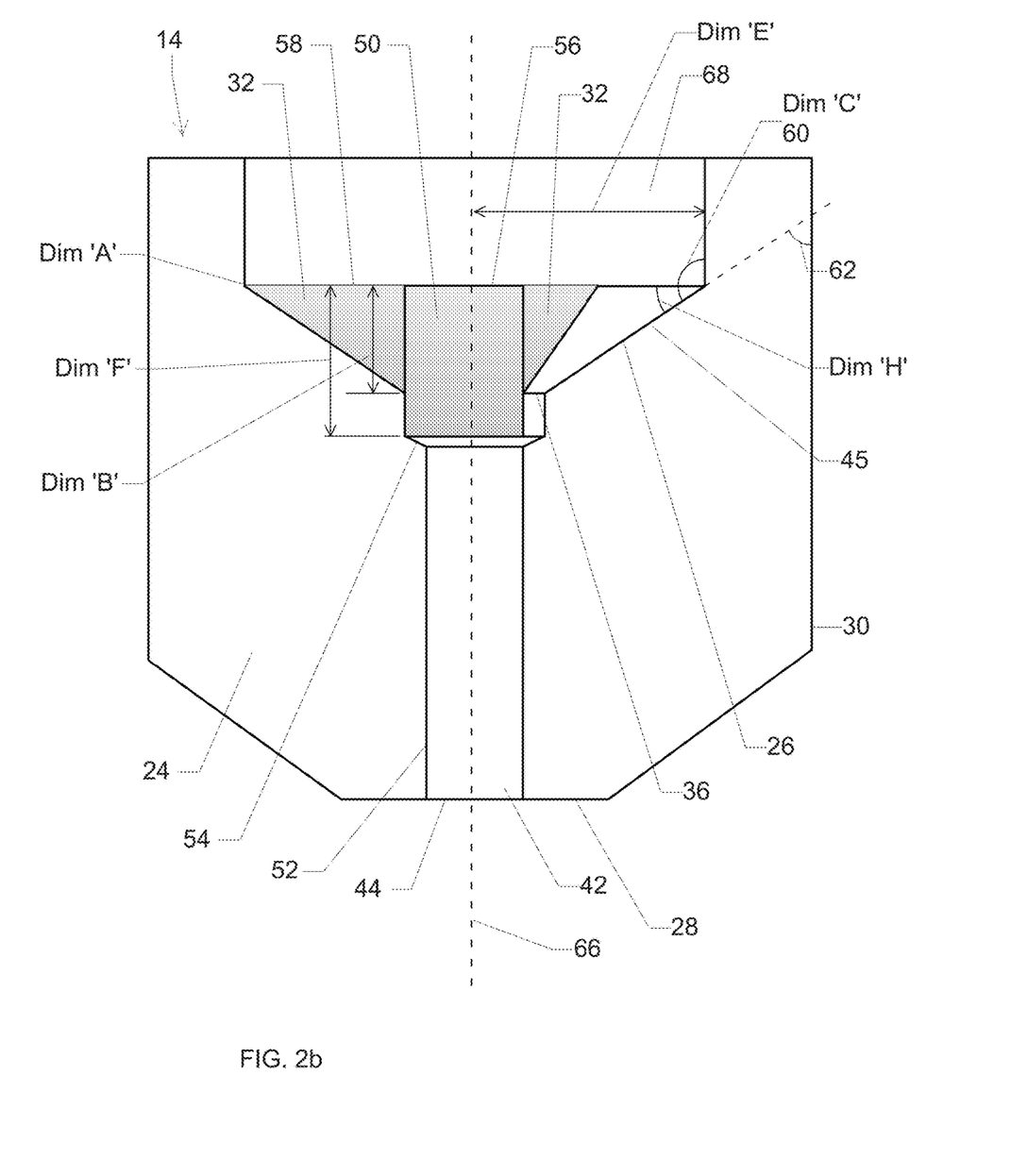
FIG. 2b shows an embodiment of a chromatography plug.

In some embodiments, such as is shown in FIG. 2b, a bridge 50 can be positioned between the first ends 46 of ridges 32. Bridge 50 can be connected or disconnected from the ridges 32, such as being connected at first end 46.

Figure 3:
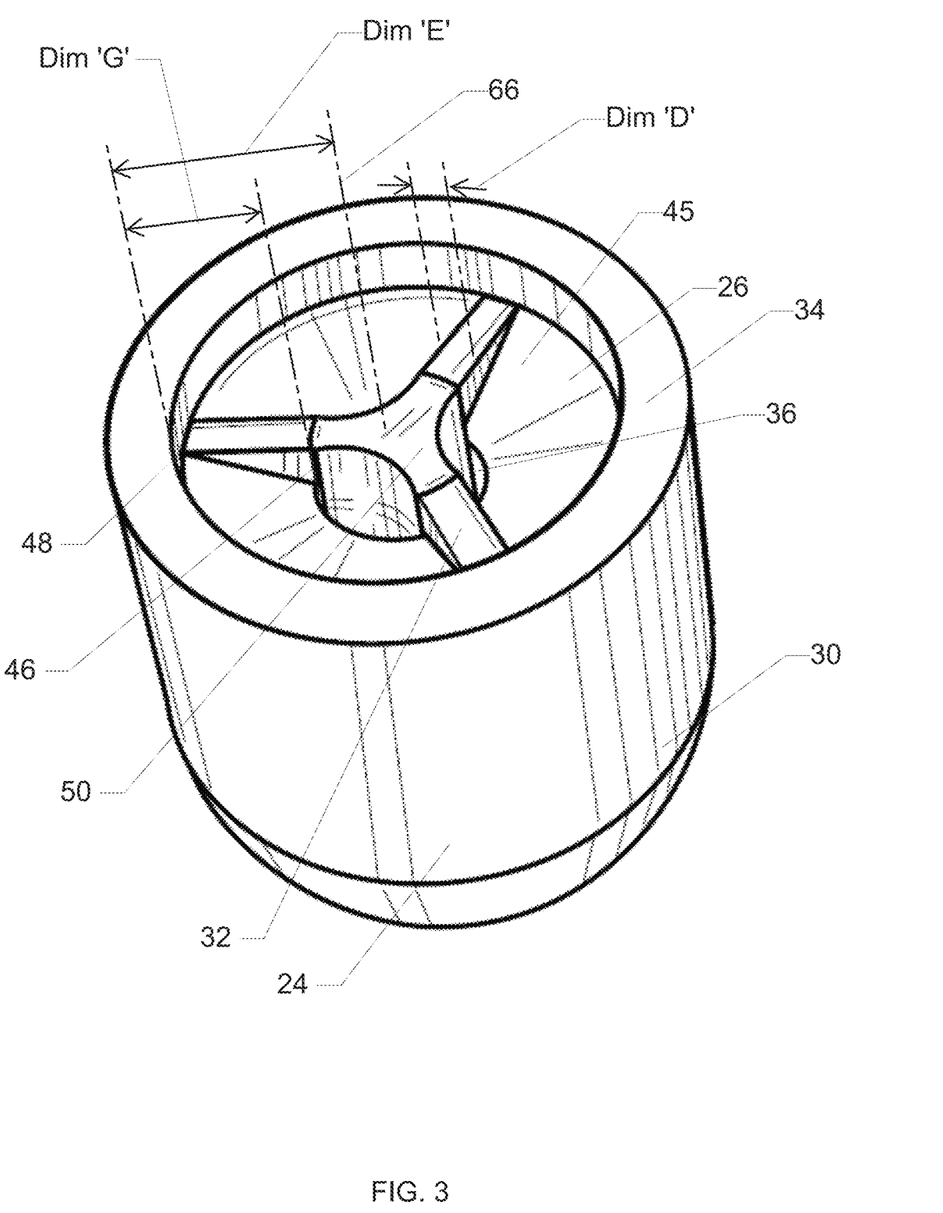
FIG. 3 shows a top perspective view of an embodiment of a chromatography plug.

FIG. 3 is a top perspective view of an embodiment of a plug 14 with the ridges 32 and bridge 50 arranged in a hub and spoke pattern. In this embodiment, the plug can be viewed as extending upward from the first surface 26 or as extending down into the passage 42, with the top surface 56 of the bridge 50 being level or approximately level with the top surface 58 of the ridges 32. Openings 36 in first surface 26 are adjacent to the bridge 50 and the first ends 46 of the ridges 32. The first surface 26 can have a portion that slopes from the peripheral rim 34 to the bridge 50 and/or the openings 36 in the first surface 26.

Bridge

A bridge 50 can be positioned between the first ends 46 of the plurality of ridges 32 to assist in supporting a partition 20 located on or above the plurality of ridges 32. The bridge 50 can have a top surface 56 is external to the body 24 and facing away from the first surface 26, the top surface 56 of the bridge 50 can be even or approximately even with a top surface 58 of one or more or all of the plurality of ridges 32. One embodiment of a bridge 50 positioned between the first ends 46 of the plurality of ridges 32 and in a position to support a partition 20 is shown in FIG. 2b. In some embodiments, the bridge 50 can contact or connect to the ridges 32, such as the first ends 46 of the ridges 32 as shown in FIG. 2b. In some embodiments, there can be a gap between the bridge 50 and the first end 46 of one or more or all of the ridges 32. In some embodiments, the bridge 50 can extend over at least a portion of the opening 36 in first surface 26. In some embodiments, the bridge 50 can extend into the body 24 at opening 36 in first surface 26. In some embodiments, the bridge 50 can extend over at least a portion of opening 36 in first surface 26 and extend into opening 36.

The bridge 50 can be circular or some other shape, such as a shape comprising lobes or extensions directed toward one, multiple or all of the plurality of ridges 32, such as shown in FIG. 3. In some embodiments, the bridge can be a series of segments that extend from at least a portion of the plurality of ridges 32 over the opening 36 in the first surface 26 and connect to one another over the opening 36.

In some embodiments, the bridge 50 can extend into body 24 at the opening 36 and be supported by an interior surface 52 of the passage 42 so as to prevent movement along an axis 56 of the passage, in a radial direction of the passage and/or in an angular direction in relation to the central axis 66. In various embodiments, the interior surface 52 can comprise a ledge 54 that the bridge contacts where the ledge 54 prevents further movement of the bridge into the passage 42.

A bridge 50 that extends into the passage 42 can be held in place by any appropriate means, such as by one or more of gravity, friction with the passage 42, contact with ridges 32, contact with a ledge 54, glue, cement, welding and molding or machining in place. In some embodiments, bridge 50 can be a separate part that can then be installed in the space between the ridges 32 or into passage 42. In some embodiments, the bridge 50 can be made as a part of the body 24 of plug 14 as a unitary construction such as by molding the bridge 50 into the body 24 when the body 24 is molded, machining the features of the bridge 50 into the body 24, or providing material and/or a portion of the features of the bridge 50 as a part of constructing the body 24 as a laminated part. In some embodiments, the bridge 50 can be made by making a portion of the bridge 50 as a separate part and a portion as a part of the body as a unitary construction.

While it is desirable to include a bridge 50 as disclosed herein, some embodiments of a plug can be made without a bridge 50. In some such designs, the opening 36 in first surface 26 can be present where the bridge 50 is otherwise described herein.

Barrier

Figure 4:
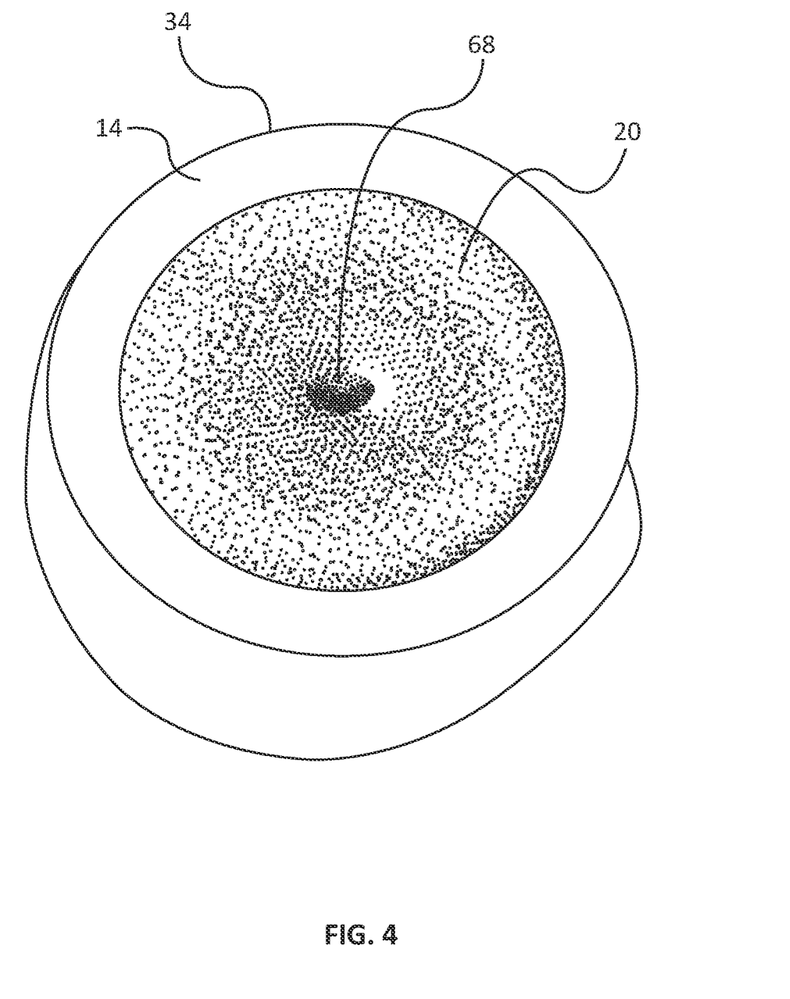
FIG. 4 shows an embodiment of a porous partition used with one embodiment of a chromatography plug.
Figure 5:
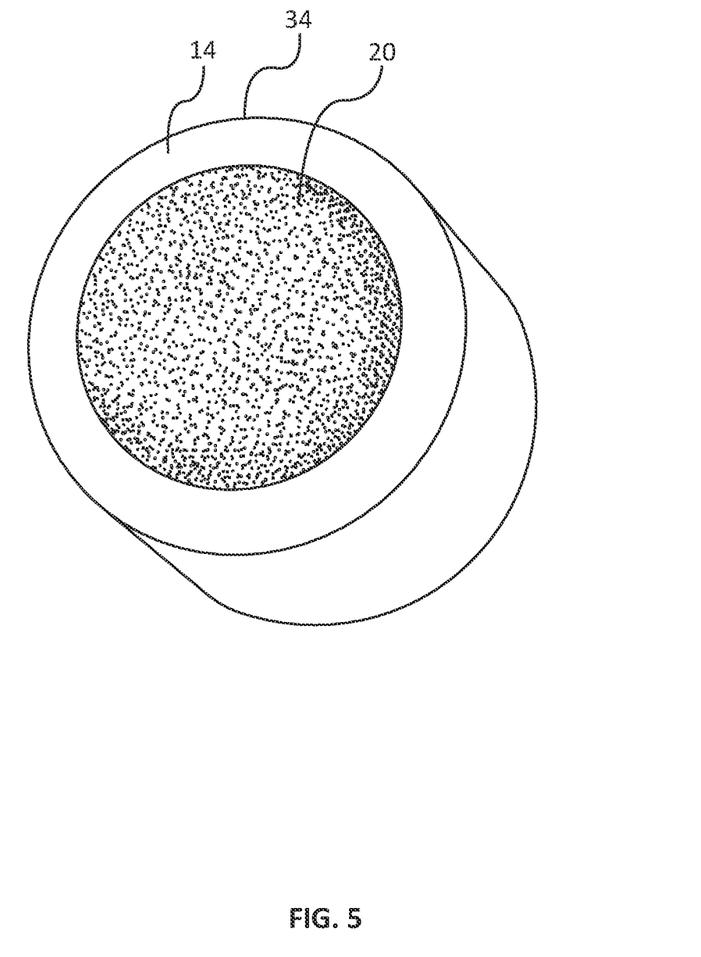
FIG. 5 shows an embodiment of a porous partition used with one embodiment of a chromatography plug.

The partition 20 can be a body with a porous structure making it a porous partition that allows fluid to pass through. Examples of partitions can include bodies comprising fritted disks, filter elements, and the like. The partition 20 can be sized and configured to be supported by the ridges 32 and bridge 50 while extending to the edge of the circumferential surface 30 of body 24. However, in some embodiments where first surface 26 includes optional peripheral rim 34, the partition 20 can be located in a central opening 68 defined by the first surface 26 with the peripheral rim 34 at a periphery of the central opening, and can be supported by the ridges 32 and bridge 50 while substantially filling the central opening 68 in the body 24 above the top surface 58 of the ridges 32 and below the top face 64 of peripheral rim 34, such as shown in FIGS. 1, 4 and 5. In some embodiments, the partition 20 can be fitted to the body 24 to prevent the passage of medium between the partition 20 and the peripheral rim 34.

In some embodiments, the partition 20 can have a cylindrical shape having a flat upper surface opposing a flat lower surface with a cylindrical surface extending between. Such a shape for partition 20 can be particularly suited for bodies 24 where the top surfaces 58, 56 of the ridges 32 and bridge 50 form a substantially flat surface that is perpendicular to the circumferential surface 30 and where optional peripheral rim 34 is present. However, alternate shapes can also be used as desired by a designer of chromatography columns. Some particularly suitable shapes include those that have a contoured lower surface that is sized and configured to follow the contours of the top surface 58 of the ridges 32 and top surface 56 of bridge 50. In some embodiments, suitably contoured surfaces can include those where the top surfaces 58, 56 of the ridges 32 and bridge 50 are lower or higher in the center of the top surface 26. In some embodiments, the upper and/or lower surface of the partition can be curved or domed. In some embodiments, a second porous partition can be present such that the mobile phase flows through one and then the other, such as through the first porous partition then the second porous partition at the inlet and through the second porous partition then the first porous partition at the outlet of the column. In some embodiments, the first and second porous partitions can be in contact with one another. In some embodiments, the first and second porous partitions can have a different pore size from one another, such as where the porous partition closer to the stationary phase has smaller or larger pores than the other porous partition.

Passage

A passage 42 through the body 24 can connect the opening 36 in the first surface 26 with an opening 44 in the second surface, and be configured to provide a flow path from the first surface 26 to the second surface 28. In some embodiments, more than one opening 36 can be present in the first surface 26 that the passage 42 connects to the opening 44 in the second surface. In some embodiments, the number of openings 36 in the first surface can be equal to the number of ridges 32.

The openings 36 in the first surface can be located in a central portion of the first surface 26 or in a more peripheral location. Suitable locations can include, but are not limited to adjacent to the first ends 46 of the ridges 32 and adjacent to the bridge 50.

In some embodiments, passage 42 can comprise a plurality of channels that connect distinct openings 36 in the first surface with a single or with multiple distinct openings 44 in the second surface.

Materials

The body 24, the ridges 32, the bridge 50 and the partition 20 can be any suitable material, each being selected independently of the other. However, in some embodiments it can be desirable to use a material for at least one or all of the body 24, the ridges 32, the bridge 50 and the partition 20 that is resistant to accumulation of components of the mobile phase or sample, as such accumulation can lead to changes in the quality of separation for the chromatography column. Accordingly, in various embodiments, materials such as metals or polymers or ceramics can be used. Suitable metals can include, but is not limited to, stainless steels, nickel and nickel alloys, titanium and titanium alloys, etc. Suitable ceramics can include but is not limited to, silica, alumina, silicon nitride, aluminum nitride, etc. Suitable polymers can be glass-filled or not glass-filled. Polymers can include, but is not limited to, fluoropolymers, polyolefins, polyesters, polyamides, etc. In some preferred embodiments, the polymer can be or include polyvinylidene fluoride (PVDF), polypropylene (PP), High density polyethylene (HDPE), low density polyethylene (LDPE), polyvinylchloride (PVC), polyethylene terephthalate (PET), ultra-high molecular weight polyethylene (UHMW), polyamide (PA, including grades such as Nylon 12), polyetheretherketone (PEEK), polysulfone (PSU), polyester, thermoplastic elastomer (TPE), polyurethane (PUR), polyimide (PI, including grades such as those suitable for structural shapes including sintered shapes) or polyetherimide (PEI, including grades such as Ultem) or combinations thereof. (preferred forms of polyimide can include those that are suitable for making structural shapes.) In various embodiments, one or more of the body 24, the ridges 32, the bridge 50 and the partition 20 can comprise one or more of these suitable materials.

EXAMPLE 1

Two chromatography columns were prepared from stainless steel tube having a 4.0 mm internal diameter (¼" outer diameter) and 40 mm total length with a plug in one end and a porous partition in each plug. The plug, ribs and bridge were polyvinylidene fluoride. The porous partition was HDPE. The dimensions of each plug are as below.

| Location | Dimension | Measurement |
|---|---|---|
| Height of ridge at first end (46) | B | 0.28 mm |

-continued

| Location | Dimension | Measurement |
|---|---|---|
| Height of ridge at second end (48) | A | ~0 mm |
| Angle between sloped first surface and the peripheral rim. | C | 102° |
| Width of the ridge | D | 0.500 mm |
| Distance between the central axis of the plug and the peripheral rim (one half the diameter of the porous partition) | E | 2 mm |
| Height of the bridge | F | 0.550 mm |
| Distance between the first and second ends of the ridge | G | 1.425 mm |
| Angle between first surface and top surface of ridge | H | 12° |
| Radius of edge between the first surface and the passage at the opening in the first surface | | 0.27 mm |

The column was filled with media (non-porous spherical methacrylate particles ranging between 3 and 7 micron by packing at constant pressure of 400 bar. The first column used a plug without a bridge where the opening in the first surface took up the space where the bridge would have been. The second column used a plug that included a bridge as shown in FIG. 2b.

After packing each column, the column was disassembled and the porous partition for each column was inspected. FIG. 4 shows the porous partition of the first column (plug without bridge) and FIG. 5 shows the porous partition of the second column (plug with bridge). The porous partition associated with the plug without a bridge shows a hole 68 through the porous partition at a location between the first ends of the ribs. The porous partition associated with the plug with a bridge did not have a hole through the porous partition.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

Use of language such as "about", "approximately", "substantially" are intended to carry the meaning as understood by a person of skill in the art in the context presented where small changes can occur to a numerical value or a comparison of parts or values so described which do not change the functioning of the device, unless the context implies a more specific value. In situations where a person of skill would require further guidance, a variation of 5% would be intended. In addition, where numerical values are provided, or where one dimension or value is described as the same as another, the value can be exactly the value provided or within a tolerance of 5% or the equivalent dimensions or values can be exactly the same or within a tolerance of 5%.

Sharp corners shown in the drawings can be replaced with rounded corners, beveled corners, etc., such as at the transition between the first surface and the opening in the first surface, as well as at other locations throughout the figures, each corner being independently determined as rounded or sharp. Rounded corners can in some embodiments have a radius of 0.27 mm or larger or smaller radii.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following:

Chromatography column components are described. One component, a chromatography plug, can include a body, the body including: a first surface; a second surface opposing the first surface; a passage through the body extending from an opening in the first surface to an opening in the second surface; and a circumferential surface extending from the first surface to the second surface; a plurality of ridges, located on the first surface, wherein each of the plurality of ridges having a first end and an opposed second end, and the first end of each of the plurality of ridges being closer to one another than the second ends of each of the plurality of ridges. In some instances, a bridge can be located between the first ends, the bridge extending into the body. A porous partition can be located on or in the plug. In some embodiments, a first and a second porous partition can be present with the two arranged in series.

Concepts

Concept 1. A chromatography plug comprising:
   a body, the body comprising:
   a first surface;
   a second surface opposing the first surface;
   a passage through the body extending from an opening in the first surface to an opening in the second surface; and
   a circumferential surface extending from the first surface to the second surface;
   a plurality of ridges, located on the first surface, wherein each of the plurality of ridges having a first end and an opposed second end, and the first end of each of the plurality of ridges being closer to one another than the second ends of each of the plurality of ridges; and a bridge located between the first ends, the bridge extending into the body.

Concept 2. The chromatography plug of Concept 1, wherein the plurality of ridges comprises three ridges.

Concept 3. The chromatography plug of Concept 2, wherein the three ridges and the bridge are arranged in a hub and spoke pattern with the bridge at the center.

Concept 4. The chromatography plug of any one of Concepts 1, 2 or 3, wherein the body is a polymeric material.

Concept 5. The chromatography plug of Concept 4, wherein the polymeric material is polyvinylidene fluoride.

Concept 6. The chromatography plug of Concept 4, wherein the ridges and bridge are a polymeric material.

Concept 7. The chromatography plug of Concept 5, wherein the ridges and bridge are polyvinylidene fluoride.

Concept 8. The chromatography plug of any one of Concepts 1-7, wherein the circumferential surface is cylindrical.

Concept 9. The chromatography plug of any one of Concepts 1-8, wherein the first surface comprises:

a peripheral rim located at a periphery of the first surface, the first surface defining a central opening with the peripheral rim at a periphery of the central opening, the peripheral rim having a top face directed away from the second face; and a sloped face extending from the peripheral rim to the opening in the first surface, wherein the sloped face forms an obtuse angle with the peripheral rim;

wherein each of the plurality of ridges is recessed from the top face, each of the plurality of ridges having a top surface distal the first surface and the bridge having a top surface;

the bridge extending into the body at the opening in the first surface and supported by an interior surface of the passage and the bridge having a top surface external to the body and facing away from the first surface.

Concept 10. A chromatography column cartridge comprising:

a tube having a first end and a second end opposite the first end;

the chromatography plug of Concept 9 located in the first end with the circumferential surface in sealing communication with the tube; and a porous partition located in the central opening and contacting the peripheral rim and supported by the top surfaces of the plurality of ridges and the top surface of the bridge.

Concept 11. A chromatography column cartridge comprising:

a tube having a first end and a second end opposite the first end;

a first chromatography plug, the first chromatography plug being the chromatography plug of Concept 9, located in the first end with the circumferential surface in sealing communication with the tube;

a porous partition located in the central opening and contacting the peripheral rim and supported by the top surfaces of the plurality of ridges and the top surface of the bridge;

a second chromatography plug, the second chromatography plug being the chromatography plug of claim 9, the second chromatography plug located in the second end with the circumferential surface of the second chromatography plug in sealing communication with the tube;

a second porous partition located in the central opening of the second chromatography plug and contacting the peripheral rim of the second chromatography plug; and chromatography medium located within the tube between the porous partition and the second porous partition.

The invention claimed is:

1. A chromatography plug comprising:
a body, the body comprising:
a first surface having an opening;
a second surface located distal to the first surface, the second surface having an opening;
a passage through the body extending from the opening in the first surface to the opening in the second surface; and
a circumferential surface extending between the first surface and the second surface;
a plurality of ridges, located on the first surface, wherein each of the plurality of ridges having a first end and an opposed second end, and the first end of each of the plurality of ridges being closer to one another than the second ends of each of the plurality of ridges; and
a bridge located between the first ends, the bridge extending into the body of the plug at the opening in the first surface while leaving partial access to the opening and supported by an interior surface of the passage, wherein the bridge does not include a fluid passage for fluid flow therethrough, wherein the fluid flow is directed through the partial access to the opening in the first surface into the passage.

2. The chromatography plug of claim 1, wherein the plurality of ridges comprises three ridges.

3. The chromatography plug of claim 2, wherein the three ridges and the bridge are arranged in a hub and spoke pattern with the bridge at the center.

4. The chromatography plug of claim 1, wherein the body is a polymeric material.

5. The chromatography plug of claim 4, wherein the polymeric material is polyvinylidene fluoride.

6. The chromatography plug of claim 4, wherein the ridges and bridge are a polymeric material.

7. The chromatography plug of claim 5, wherein the ridges and bridge are polyvinylidene fluoride.

8. The chromatography plug of claim 1, wherein the circumferential surface is cylindrical.

9. The chromatography plug of any one of claim 1, wherein the first surface comprises:
a peripheral rim located at a periphery of the first surface, the first surface defining a central opening with the peripheral rim at a periphery of the central opening, the peripheral rim having a top face directed away from the second surface; and
a sloped face extending from the peripheral rim to the opening in the first surface,
wherein the sloped face forms an obtuse angle with the peripheral rim;
wherein each of the plurality of ridges is recessed from the top face.

10. The chromatography plug of claim 1, wherein the bridge comprises a series of segments that extend from at least a portion of the plurality of ridges over the opening in the first surface and connect one another over the opening.

11. The chromatography plug of claim 1, wherein each of the plurality of ridges having a top surface distal the first surface of the body and the bridge having a top surface substantially level with the top surfaces of the ridges.

12. A chromatography column cartridge comprising:
a tube having a first end and a second end opposite the first end;

the chromatography plug of claim 9 located in the first end with the circumferential surface in sealing communication with the tube; and
a porous partition located in the central opening and contacting the peripheral rim and supported by top surfaces of the plurality of ridges and a top surface of the bridge.

13. A chromatography column cartridge comprising:
a tube having a first end and a second end opposite the first end;
a first chromatography plug, the first chromatography plug being the chromatography plug of claim 9, located in the first end with the circumferential surface in sealing communication with the tube;
a porous partition located in the central opening and contacting the peripheral rim and supported by top surfaces of the plurality of ridges and a top surface of the bridge;
a second chromatography plug, the second chromatography plug being the chromatography plug of claim 9, the second chromatography plug located in the second end with the circumferential surface of the second chromatography plug in sealing communication with the tube;
a second porous partition located in the central opening of the second chromatography plug and contacting the peripheral rim of the second chromatography plug; and
chromatography medium located within the tube between the porous partition and the second porous partition.

* * * * *